US009464787B2

(12) United States Patent
Schenk et al.

(10) Patent No.: US 9,464,787 B2
(45) Date of Patent: Oct. 11, 2016

(54) DIRECTION CONTROLLABLE LIGHTING UNIT WITH ULTRASOUND

(71) Applicant: Koninklijke Philips Electronics N.V., Eindhoven (NL)

(72) Inventors: Tim Corneel Wilhelmus Schenk, Eindhoven (NL); Lorenzo Feri, Eindhoven (NL); Hendricus Theodorus Gerardus Maria Penning De Vries, Mierlo (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 590 days.

(21) Appl. No.: 13/893,400

(22) Filed: May 14, 2013

(65) Prior Publication Data

US 2013/0250590 A1  Sep. 26, 2013

Related U.S. Application Data

(63) Continuation of application No. 12/741,842, filed as application No. PCT/IB2008/054738 on Nov. 12, 2008, now Pat. No. 8,462,586.

(30) Foreign Application Priority Data

Nov. 16, 2007  (EP) .................................... 07120834

(51) Int. Cl.
| | |
|---|---|
| *G01S 3/80* | (2006.01) |
| *G01S 11/00* | (2006.01) |
| *F21V 14/02* | (2006.01) |
| *H05B 37/02* | (2006.01) |
| *G01S 11/14* | (2006.01) |
| *G01S 3/801* | (2006.01) |

(52) U.S. Cl.
CPC ................ *F21V 14/02* (2013.01); *G01S 11/14* (2013.01); *H05B 37/029* (2013.01); *G01S 3/801* (2013.01)

(58) Field of Classification Search
USPC .......................................... 367/118
See application file for complete search history.

(56) References Cited

U.S. PATENT DOCUMENTS

| | | | | |
|---|---|---|---|---|
| 4,490,716 A | * | 12/1984 | Tsuda et al. | .................. 340/904 |
| 4,980,871 A | | 12/1990 | Sieber | |

(Continued)

FOREIGN PATENT DOCUMENTS

| | | |
|---|---|---|
| JP | 2000276912 A | 10/2000 |
| JP | 2007161172 A | 6/2007 |

(Continued)

*Primary Examiner* — James Hulka
(74) *Attorney, Agent, or Firm* — Meenakshy Chakravorty (57) ABSTRACT

A direction controllable lighting unit 10 for use in a lighting system is described. The light emission of the lighting unit 10 may be directed into different directions, e.g. by use of a mechanically movable element 14, 60. At least two ultrasound transmitters 20a, 20b, or ultrasound receivers 21a, 21b are disposed at the lighting unit 10 such that they differ in position, or in direction or shape of the spatial intensity distribution or spatial distribution of reception sensitivity. A mobile control element 46 has at least one corresponding ultrasound transmitter or receiver 50. A difference between a signal from a transmitter received at multiple receivers, or a signal of multiple transmitters received at a single receiver is used to determine a relative direction of the direction controllable lighting unit 10 and the control element 46, and to control the direction of the lighting unit 10 in dependence thereof.

12 Claims, 6 Drawing Sheets

(56) References Cited

U.S. PATENT DOCUMENTS

| | | | |
|---|---|---|---|
| 5,504,477 A | 4/1996 | Whitright et al. | |
| 6,803,727 B2 | 10/2004 | Lalerum et al. | |
| 7,221,271 B2 | 5/2007 | Reime | |
| 7,902,490 B2 * | 3/2011 | DiDomenico | 250/203.4 |
| 8,462,586 B2 * | 6/2013 | Schenk et al. | 367/118 |
| 2004/0036586 A1 * | 2/2004 | Harooni | 340/435 |
| 2006/0044800 A1 | 3/2006 | Reime | |
| 2008/0178867 A1 * | 7/2008 | DiDomenico | 126/573 |
| 2010/0225245 A1 * | 9/2010 | Schenk et al. | 315/294 |

FOREIGN PATENT DOCUMENTS

| | | |
|---|---|---|
| WO | 9514241 A | 5/1995 |
| WO | 0216824 A1 | 2/2002 |
| WO | 2004039631 A | 5/2004 |
| WO | 2006111927 A1 | 10/2006 |
| WO | 2007072314 A1 | 6/2007 |
| WO | 2009003279 A | 1/2009 |

* cited by examiner

DIRECTION CONTROLLABLE LIGHTING UNIT WITH ULTRASOUND

This application is a continuation application under 35 USC §120 of pending application Ser. No. 12/741,842 filed May 7, 2010, which is a national stage application and claims priority to PCT No. PCT/IB08/54738 filed Nov. 12, 2008 which claims priority to EP application No. 07120834.2 filed Nov. 16, 2007, all of which are incorporated by reference in their entirety.

FIELD OF THE INVENTION

The present invention relates to lighting units and control thereof, and more specifically to a direction controllable lighting unit, a controllable lighting system comprising at least one direction controllable lighting unit and a method for controlling a lighting system with at least one direction controllable lighting unit.

BACKGROUND OF THE INVENTION

Direction controllable lighting units are known and used e.g. in lighting for entertainment purposes, such as in nightclubs and theatres. In the present context, the term "direction controllable" will be used to refer to lighting units which have a directed light emission, i.e. that has a specific direction as opposed to isotropic light emission (e.g. spot lights), where the direction of this light emission is automatically (non-manually) controllable.

WO 2007/072314 discloses a lighting system with lighting units in light fixtures and a remote control device. The remote control device transmits via a transceiver therein a signal. Upon receipt of the signal, the light fixtures transmit response signals. The remote control may then be used to control various parameters of the nearest light source, such as the beam direction thereof, e.g. by control of a motor or filter device for pan and tilt operation. Further, the remote control calculates its location or distance relative to the light fixtures, e.g. through triangulation, signal strength, time of flight or beam direction. The communication over the transceiver may be radio, such as e.g. Zigbee or Bluetooth, but could also be an RFID or ultrasound tag. The remote control may be configured to control the directivity of the lamps towards its location, e.g. by changing direction.

SUMMARY OF THE INVENTION

It is an object of the present invention to provide a direction controllable lighting unit which facilitates directional control, especially automatic directional control.

According to the invention, this object is solved by a direction controllable lighting unit according to the claims, a lighting system according to the claims and a method for controlling a lighting system according to the claims. Dependent claims refer to preferred embodiments of the invention.

The inventors have recognized that prior direction controllable lighting units and control systems provide little information which may suitably be used for automatic directional control. Therefore, it is a basic idea of the invention to provide, at the lighting unit, at least two ultrasound transmitter and/or receiver units, which are arranged in away such that their ultrasound emission (transmitters) or ultrasound reception (receivers) differs. A corresponding lighting unit may therefore transmit and/or receive ultrasound signals which may advantageously be used for controlling the direction of the light emission of the lighting unit in a desired way.

The lighting unit according to the invention is direction controllable, and therefore comprises means for directing the light emission into different directions. As will become apparent in the following detailed description, such light directing means may be understood broadly to cover any means suited to change the light emission direction, e.g. to change the angle of an optical axis defined as the center of intensity of the emitted light bundle or beam. Such means include mechanical means (e.g. a motor for a light source fixture or of an optical element, e.g. a rotatable lens) as well as electrical means (e.g. using voltage sensitive optical devices). Further, in accordance with a preferred aspect of the invention, a direction controllable lighting unit may also comprise a plurality of light sources facing into different, fixed directions and a corresponding driving means for controlling these light sources to vary the relative intensity and thereby influence the direction of the resulting summarized light emission.

Further, according to the invention, there are first ultrasound means provided at the lighting unit comprising at least two ultrasound transmitter and/or receiver units. These are arranged at the lighting unit such that they have different spatial reception or emission characteristics.

This means, that—the case of transmitters—they provide different ultrasound emissions. These different transmissions may be achieved by arranging the transmitters in different positions, i.e. at a distance to each other, or—in the case of a directed, i.e. non-isotropic emission pattern—in different directions, such that they are arranged at an angle. Also, the ultrasound emissions may differ in shape (e.g. narrow emission/wide emission), or any of the above mentioned differences may be combined. Thus, in the case of transmitters, the emitted ultrasound will differ, so that at reception positions the ultrasound signal emitted by the two transmitters will be received differently, e.g. with regard to amplitude and/or phase.

In the case of receiver units, these are also arranged differently at the lighting unit. They may differ in position and/or in direction (if they have a directed, i.e. non-isotropic reception sensitivity). Alternatively or in addition they may have a differently shaped spatial distribution of reception sensitivity (e.g. broad/narrow). In the case of two ultrasound receivers there will thus be a configuration where ultrasound transmissions from transmitter positions will be received differently at the receiver units, e.g. with different amplitude and/or phase.

The thus provided first ultrasound means at the lighting unit serve to give additional information which may be used for controlling the direction of the lighting unit. This may be used in a lighting system which has at least one direction controllable lighting unit as described above and a mobile control element with second ultrasound means, complementary to the first ultrasound means of the lighting unit (i.e. if the lighting has transmitters, the mobile control element will have at least one receiver; if the lighting unit has receivers, the mobile control element will have at least one associated transmitter).

In order to control the direction of the direction controllable lighting unit with regard to the position of the mobile control element, an ultrasound signal is sent from a transmitter and received by a receiver. If the lighting unit has two receivers, the transmitter in the control element transmits an ultrasound signal which is received by the two receiver units in the lighting unit. Due to the different arrangement or reception characteristics of the receivers in the lighting unit, the signal will be received differently by the two receivers. Similarly, if the lighting unit has two transmitters, these both emit ultrasound signals, which are received at the control element. Due to the differences between the transmitters° positions, directions or characteristics, the ultrasound receiver there receives the signals from the two transmitters differently.

Subsequently, the mentioned difference between the signals is evaluated to determine a relative direction of the direction controllable lighting unit in relation to the position of the mobile control element. Then, the direction of the controllable lighting unit may be controlled by using this information, e.g. to point the lighting unit towards the control element's position.

In a simple example, if a lighting unit has a first ultrasound transmitter pointing to the right, and a second ultrasound transmitter pointing to the left, an observer identifying received ultrasound as coming from the first transmitter can gather from this the information that the lighting unit is pointed to his left. In case the observer simultaneously receives ultrasound from both transmitters, a comparison of received intensies of the signals may yield information if the lighting unit is pointed directly towards the observer (such that signals from both transmitters are received at the same intensity), or if an offset remains.

Therefore, a lighting unit according to the invention may greatly facilitate any type of control task related to automatically controlling the direction of the lighting unit.

There are various preferred, optional aspects of the invention. The light source of the lighting unit may of course be any known type, such as incandescent lamp, discharge lamp, fluorescent lamp or LED lamp. The control element is a mobile, preferably handheld device, which may be wire connected but is preferably wireless. The control means may be arranged within the lighting unit, within the mobile control element or elsewhere. They may be implemented as suitable electronics such as a microcontroller or microprocessor executing a corresponding program. It should be noted that the control means need not necessarily be a single, dedicated assembly, but may be implemented also by an assembly serving the control purposes among other tasks, such as e, g, a main processor that executes a control program as one of several programs serving different purposes.

Further, it is preferred that the control means are provided with some type of connection (e.g. cable, such as direct control connections or powerline, as well as wireless, such as radio or infrared) both to the optical sensor and to the lighting unit. The control means automatically controls the direction of the lighting unit (by driving its directing means over the connection) based on information received from the mobile control element.

According to a preferred embodiment, the first ultrasound means at the lighting unit comprise at least two ultrasound transmitter units, which transmit distinguishable ultrasound signals. The signals may be distinguishable in many ways, e.g. as ultrasound signals of different frequency. Also, the ultrasound signals may be differently modulated, e.g. as amplitude or frequency modulation. In this way, an identifier may be associated with each ultrasound transmitter unit, where the identifier is different between the two ultrasound transmitters (and in a lighting system comprising multiple controllable lighting units as described above is preferably unique among all ultrasound transmitters).

By providing such an identifier, the ultrasound signals emitted from the transmitters become distinguishable by a suitable observer, i.e. an ultrasound receiver with the ability to recognize the identifier e.g. by analyzing the frequency or by demodulating the received signal. Since the transmitters are mounted to emit ultrasound with different spatial distribution, the information about the reception of the different ultrasound signals contains information about the direction of the direction controllable lighting unit relative to the observer.

According to one embodiment, the controllable lighting unit comprises a mechanically movable element for directing the light emission. This may be a moving structure on which one or more light sources are mounted. Alternatively it is also possible that the movable element is an optical element, such as a lens or reflector, which by its movement directs the light from one more lighting units into different directions. While it is possible to arrange the ultrasound means in a fixed position at the lighting unit, according to a preferred embodiment they are disposed to move with the movable element. This allows to use the above mentioned means to not only obtain information about the relative orientation of the position of the lighting unit and the mobile control element, but instead information about the relative orientation of the current lamp direction and the position of the mobile control element, which may more easily be used for control purposes, especially for feedback control.

In alternative embodiments, where the light emission of the lighting un is directed without using mechanically movable elements, it is preferred that the first ultrasound means are arranged at the lighting unit in fixed positions. By using the above described processing of a difference between received signals, it is then possible to obtain information about the relative orientation of the position of the lighting unit and the mobile control element, and to control the direction of the light emission accordingly.

As an example of a direction controllable lighting unit without mechanically moving parts, there may be provided a plurality of light sources facing in different, fixed directions. A resulting sum light emission may be directed by controlling a relative intensity of light emission from the light sources. So, the light emission may be directed e.g. in a first direction by driving a first light source with a first level of intensity and a second light source with a second level of intensity, and into a second direction by driving the first light source with a third level of intensity and the second light source with a fourth level of intensity. If the quotient of a first and second level is different from the quotient of the third and fourth level, the resulting sum light emissions will point into different directions.

According to further developments, the difference evaluated relates to phase and/or amplitude of the received signals. For example, a phase difference and/or an amplitude quotient may be evaluated to obtain information about the relative position or orientation. In a particularly preferred embodiment, the first ultrasound means comprises transmitters emitting distinguishable ultrasound signals and the resulting ultrasound signal received at the mobile control element is analyzed determining a parameter dependent on a phase and/or amplitude difference between the signals. It is particularly preferred that the signals are distinguishable by the use of multiple access technique such as CDMA, TDMA or FDMA.

During control of the lighting unit in relation to the mobile control element it is of course possible to use the position of the mobile control element as a reference only, and to point the light source into a direction dependent on that position, but not exactly aiming at the mobile control element. However, in order to facilitate handling of control it is preferred that the controllable lighting unit is adjusted to point to the position of the mobile control element. In this way, it is very easy for a user to e.g. direct light spots to point at desired locations by placing the mobile control element there. Multiple lighting units comprised in a system may be controlled individually, all together or in selected groups. As a further feature, it is possible that the first ultrasound means will only be activated in a direction control mode of the lighting unit, but be deactivated in subsequent normal lighting (operating mode).

BRIEF DESCRIPTION OF THE DRAWINGS

The above and other objects, features and advantages of the present invention will become apparent from the following description of preferred embodiments, in which.

DETAILED DESCRIPTION OF EMBODIMENTS

Figure 1:
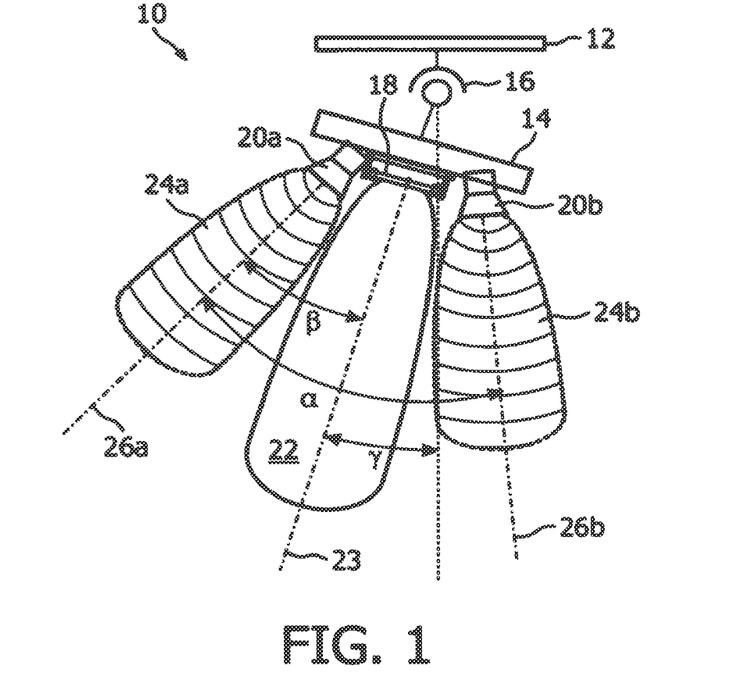
FIG. 1 shows a schematical side view of a first embodiment of a direction controllable lamp.

FIG. 1 shows in a side view a first embodiment of a direction controllable lighting unit (luminary) 10. A lighting unit comprises a mounting part 12 and a fixture 14 which is mechanically movable relative to the mounting part 12 in a motor-driven joint 16.

The fixture 14 carries a light source 18 and ultrasound means, which in the example of the first embodiment are ultrasound transmitters 20a, 20b. The light source 18 emits a directed beam of light 22 (spot light) around a central optical axis 23, the directional distribution (solid angle) of which is achieved by a suitable reflector (not shown).

The ultrasound transmitters 20a, 20b are arranged at the fixture 14 to transmit ultrasound signals 24a, 24b with spatial intensity distributions with central axes 26a, 26b. The ultrasound emissions 24a, 24b of the ultrasound transmitters 20a, 20b thus differ in spatial intensity distribution. In the shown preferred example, they differ both in position and in emission direction, i.e. the axes 26a, 26b are arranged at an angle α. Also, the ultrasound emissions 24a, 24b of the ultrasound transmitters 20a, 20b differ from the direction of light emission 22 from the light source 18, i.e. there is an angle β between the axes 26a, 26b and the central optical axis 23 of the main light sources' 18 light emission 22.

Figure 7:
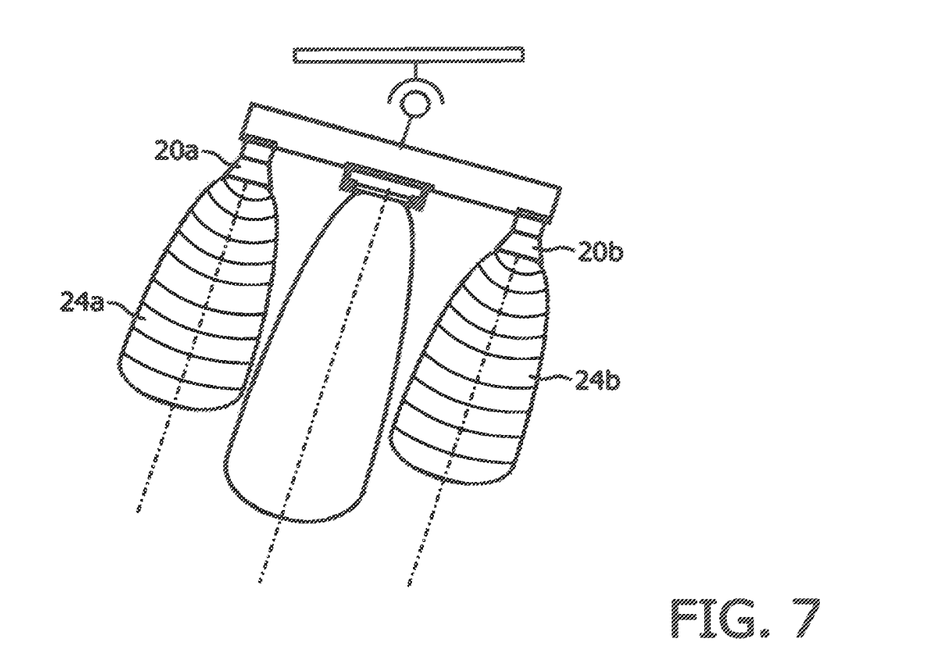
FIG. 7 shows a schematic side view of a third embodiment of a direction controllable lamp.
Figure 8:
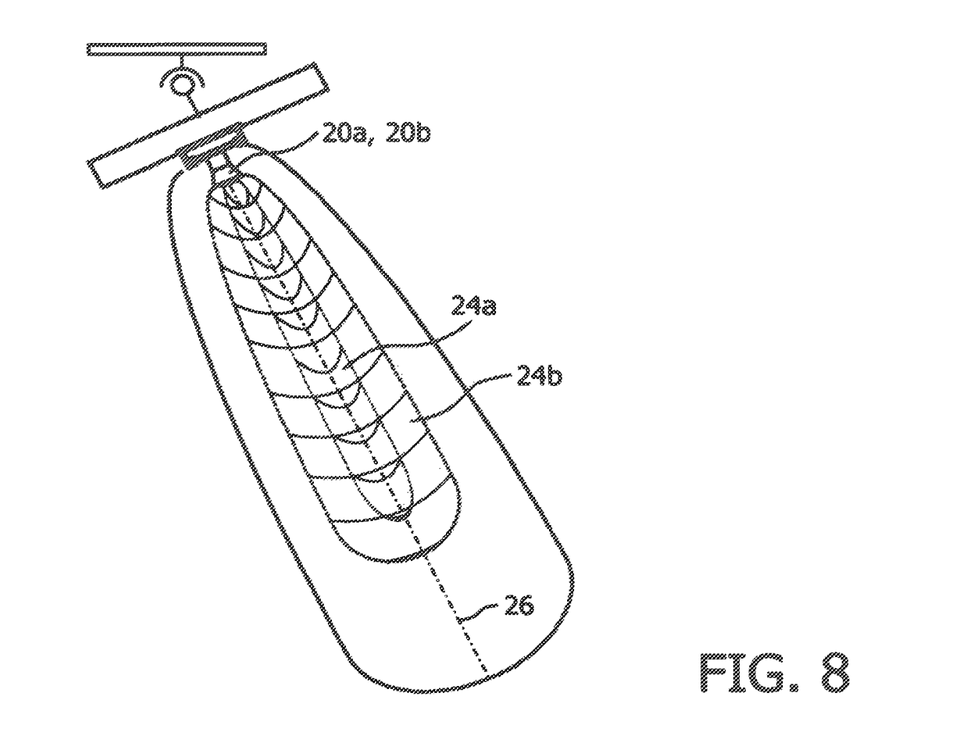
FIG. 8 shows a schematic side view of a fourth embodiment of a direction controllable lamp.

Alternatively, it would also be possible that the ultrasound transmitters 20a, 20b are arranged at a distance as shown, but emit ultrasound into parallel directions. This is shown in FIG. 7. As a further alternative, shown in FIG. 8, the emissions could be in the same direction, even with a common axis 26, if they have different shape, e.g. a first, broad emission 24a and a second, narrow emission 24b.

It should be noted that the controllable lighting unit 10 shown here is only represented schematically. The motor-driven joint 16 is not shown in detail. Different kinds of motor-driven movable mounting of lighting units are known per se to the skilled person. The type of the light source 18 may be chosen quite differently among available light sources, such as incandescent lamps, arc discharge lamps, fluorescent lamps and high power LEDs, as long as they are suited for lighting purposes, i.e. provide visible light at an intensity high enough to illuminate a certain area, e.g. parts of a room. Also, there may be multiple light sources provided as main light source(s), such as e.g. an array of LEDs, multiple incandescent lamps or even combinations of different types of light sources.

It should be noted that in the example of FIG. 1, the movement of the lighting unit is shown only as rotation around one axis, namely the axis of the joint 16. Thus, movement may be described as a plane angle γ, which may be defined between the central optical axis 23 of the light source 18 and the horizontal direction. While it is possible to provide a lighting unit 10 the direction of which is only controllable in one dimension as shown, it should be clear to the skilled person that the underlying concept of course extends to multi-dimensional movement, such that directions may then be defined by solid angles rather than plane angles. This of course also applies to the arrangement of ultrasound transmitters 20a, 20b relative to each other (angle between axes 26a, 26b) as well as relative to the optical axis 23 of the light source 18.

Figure 2:
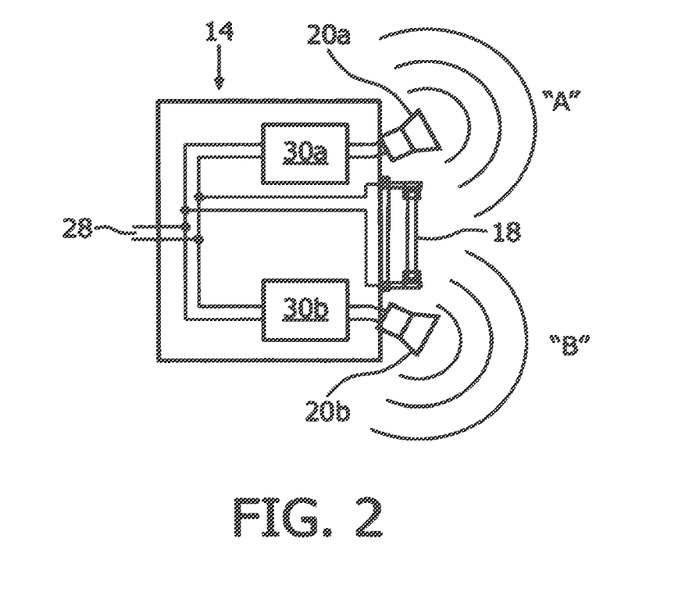
FIG. 2 shows a schematical representation of an electrical connection of elements of the lighting unit of FIG. 1.

FIG. 2 shows a simplified schematical diagram of the fixture 14 with the ultrasound transmitters 20a, 20b and the light source 18. An electrical connection 28 is provided to supply electrical energy. In order to provide distinguishable ultrasound signals, the transmitters are operated at the same basic ultrasound frequency, but with different modulation. To achieve this, modulation driver circuits 30a, 30b are provided to drive the transmitters 20a, 20h according to a modulation scheme.

The modulation may be a simple on/off control of the transmitters 20a, 20b. However, it is especially preferred that the emitted ultrasound signals are modulated using a spread spectrum technique known as "code-division multiple access" (CDMA). The individual codes, which may here be designated "A" or "B" respectively, are orthogonal to each other, i.e. a value of an autocorrelation of a code is significantly higher than a value of a cross correlation of two different codes. Thus, a demodulator may use the predetermined codes to discriminate between simultaneous transmissions of modulated ultrasound signals by different sources 20a, 20b. Also, in a preferred embodiment asynchronous CDMA codes, such as pseudo-noise (RN) sequences can be applied, since they do not require a common clock for the different transmitters. In an even further solution the signals for the different transmitters can be distinguished in the time or frequency domain, using "time-division multiple access" (TDMA) or "frequency-division multiple access" (FDMA), respectively.

The driver units 30a, 30b thus modulate the ultrasound emission 24a, 24b of the transmitters 20a, 20b such that they contain different identification codes. For example, the signal 24a emitted by the first transmitter 20a may contain a code "A", whereas the signal 24b emitted from the second transmitter 20b contains a code "B".

Use of the controllable lighting unit 10 with the described modulated transmitters 20a, 20b pointing in different directions 26a, 26b will be explained with regard to FIG. 3, which shows a lighting system 40, e.g. in in a room, with multiple light sources. A conventional, fixed light source 42 is provided, e.g. mounted at the ceiling of a room. Further, the controllable lighting unit 10 is also mounted there. The lighting unit 10 is connected to a control unit 44 such that the control unit 44 may control the direction of the light emission, which in the example as explained above may be described by the angle γ.

A mobile control element 46 is arranged within the area that may be illuminated by the lighting unit 10. The control element 46 is connected to the control unit 44.

Figure 4:
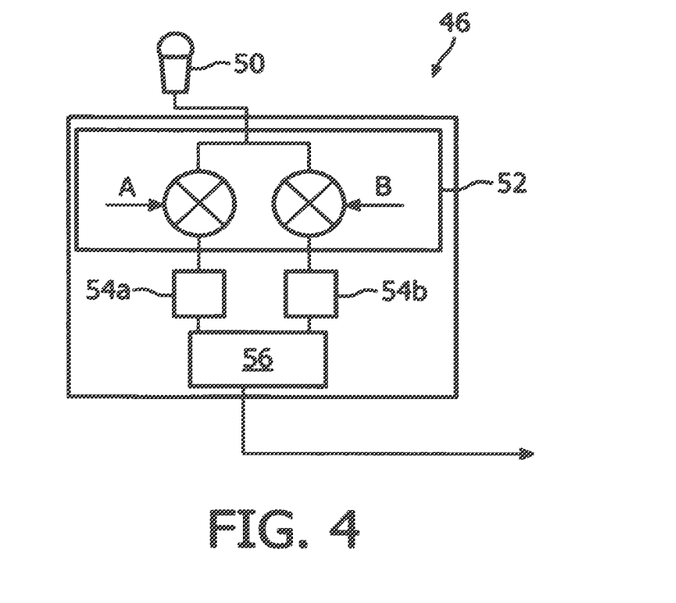
FIG. 4 shows in schematic form a mobile control element of the system of FIG. 3.

FIG. 4 shows the control element 46 in schematic form. It comprises an ultrasound receiver (microphone) 50 which receives an ultrasound signal and produces a corresponding electrical signal. The electrical signal is demodulated by a demodulation unit 52 to extract those portions of the received signal that are modulated according to codes "A" and "B". The modulation unit 52 delivers the correspondingly demodulated portions of the signal to measuring devices 54a, 54b which deliver a value representative of the phase and/or amplitude of the received signal portion modulated with codes "A", and "B", respectively. The values are then passed to an interface unit 56 and delivered to the control unit 44.

Figure 3:
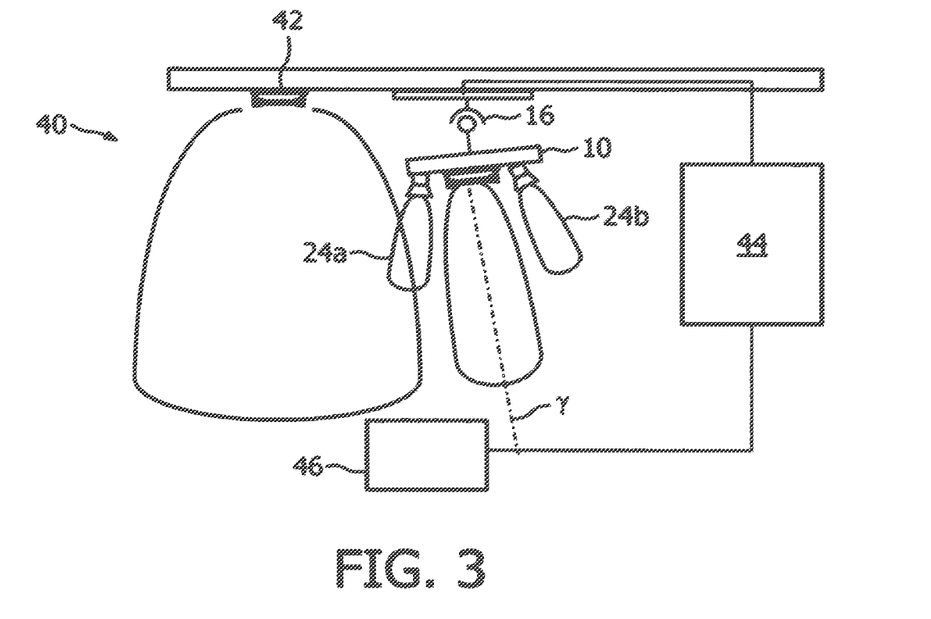
FIG. 3 shows a lighting system comprising a direction controllalight as shown in FIG. 1.

Thus, while the mobile control element 46 in the lighting system 40 of FIG. 3 might receive ultrasound signal contributions from other sources besides transmitters 20a, 20b, the signal passed on to control unit 44 only comprises information about the received intensities of the modulated signals 24a, 24b from the controllable lighting unit 10.

This allows control unit 44 to control the direct on of lighting unit 10. For example, it may be desired to direct lighting unit 10 to point to the location of the control element 46. With the position of lighting unit 10 as indicated in FIG. 3, it is clear that the lighting unit is directed too far to the right. This leads to a relatively strong incident signal 24a from the first ultrasound transmitter 20a, which is modulated according to code "A", whereas no or only a small signal modulated with code "B" is received from the second ultrasound transmitter 20b. From this information, transmitted to the control unit 44, the unit 44 may determine that the lighting unit 10 is directed too far to the right. A quotient of the received intensities will even yield a certain measure of the angular value of misalignment.

The control unit 44 thus sends corresponding control commands to the motor joint 16 to move lighting unit 10 a certain distance to the left. Then, a further measurement of amplitudes of the ultrasound signals is effected by the control element 46, such that the control unit 44 receives information indicating if the alignment is now correct (same intensity of ultrasound emissions 24a, 24b received), or if a further correaction to the left (emission 24a stronger) or even to the right (emission 24b stronger) is necessary. The control unit 44 may thus employ a closed-loop control to direct lighting unit 10 exactly such that its optical axis 23 is directed to the place of the control element 46.

Alternatively, control element 46 conic evaluate the phase difference between the signals from sources 20a and 20b. When the phase difference is minimized, the lamp is pointing at the control element.

Figure 5:
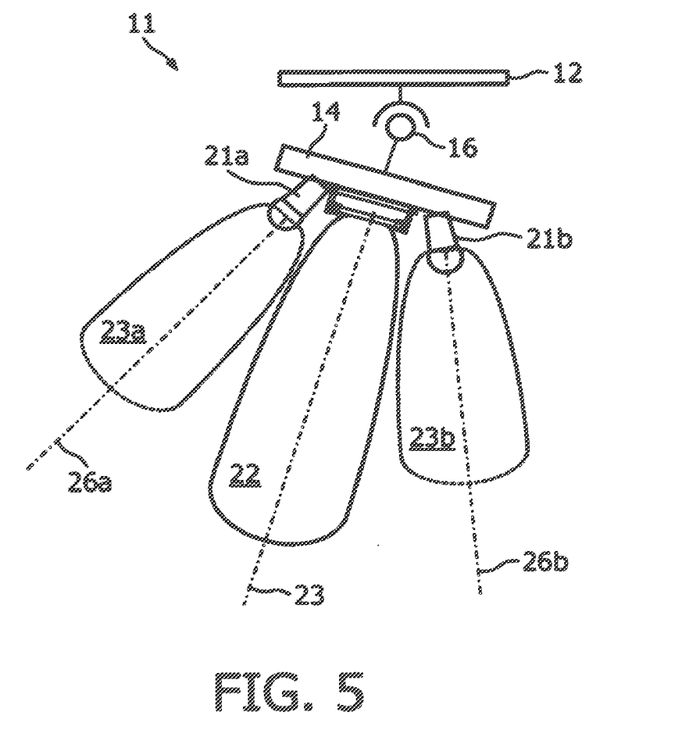
FIG. 5 shows a schematical side view of a second embodiment of a direction controllable lamp.

FIG. 5 shows an alternative embodiment of a lighting unit 11. The lighting unit 11 largely corresponds to the lighting unit 10 described in connection with FIG. 1. Like parts are referenced by like numerals. In the following, only differing parts will be further explained.

Instead of two ultrasound transmitters as in the first embodiment, the lighting unit 11 according to the second embodiment comprises two ultrasound receivers (microphones) 21a, 21b. The receivers shown in the present example have directed reception characteristics, so that their reception sensitivity is not isotropic, but differs dependent on direction. These directional characteristics are shown symbolically in FIG. 5 as reception regions 23a, 23b. It is of course understood by the skilled person that actual directional reception characteristics of a microphone are defined by threedimensional shape. For each reception region 23a, 23b, there may be a central axis 26a, 26b defined.

In the example of FIG. 5, the ultrasound receivers 21a, 21b are arranged at a distance to each other on the mechanically moving fixture 14. Further, there are arranged in different directions, i.e. such that their central axes 26a, 26b are arranged at an angle.

Resulting from this, the way ultrasound signals from transmitter positions are received at both receivers 21a, 21b will generally differ (in the shown exampie, only ultrasound signals emitted from positions on the central axis 23 will be received equally by both receivers). This is used to effect automatic control of the lighting unit 11 in a lighting system, where a mobile control unit (not shown) has a single ultrasound emitter.

The ultrasound emitter emits an ultrasound signal which may be constant or modulated, e.g. with an identifier or code.

Figure 6:
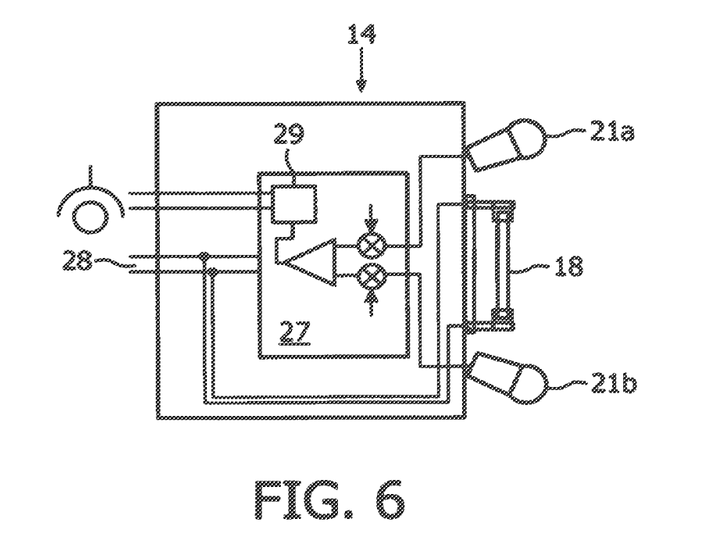
FIG. 6 shows a schematical representation of an electrical connection of elements of the lighting unit of FIG. 3.

As in the first example of a lighting system, the mobile control element with, in this case, an ultrasound transmitter, is placed within the area which may be illuminated by lighting unit 11. The ultrasound signal from the transmitter is received by both receivers 21a, 21b. Within the lighting unit 11, as shown in FIG. 6, there is arranged a processing circuit 27 connected to the electrical connection 28. Processing circuit 27 processes the signals received at the receivers 21a, 21b by identifying among possible noise in both signals the contribution from the transmitter and by comparing these two signals.

If the emitted ultrasound signal is modulated with a code, it can be better distinguished from other ultrasound signals or noise influences. In this case, there may be demodulation effected in the processing circuit 27 as indicated in FIG. 6 by correlating the received signals with the prior known code. This will suppress other signal contributions and yield signals for the later comparison that only contain the relevant information. Of course, in the case of a non-modulated ultrasound signal, the correlator units in processing circuit 27 may be omitted.

In a first variant, the comparison relates to the amplitude of the signals. An amplitude quotient is determined and passed on to a controlling unit 29. The controlling unit 29 controls the direction control means—in the present example the motor driven joint 16—according to the value of this quotient. For example, if the quotient of the amplitude of the signal received in receiver 21a divided by the amplitude of the signal received in receiver 21b is above 1, then the lighting unit is moved in the direction of receiver 21b (i.e. in the example of FIG. 5 to the right), otherwise in the opposite direction. This is repeated until the quotient reaches a value of 1, so that now the lighting unit 11 points directly at the mobile control element (such that the ultrasound transmitter there is located on central axis 23).

In a further variant, the receipt signals are compared with regard to phase. A phase difference is determined and passed on to controlling unit 29. Controlling unit 29 controls the direction control means 16 to minimize the phase difference, also leading to a configuration where the lighting unit 11 will be pointed at the mobile control element.

As in the first embodiment, also the lighting system according to the second embodiment may use further external control effected over a suitable connection, e.g. power-line communication over electrical supply 28.

While in the forgoing embodiments lighting units where shown to be direction adjustable by a mechanically moveable fixture 14, it is also possible to achieve directional control of the light emission of a lighting unit in different ways, as will next be explained with reference to FIG. 9a, 9b. It should be noted that while the examples described and shown in the preceding Figs. may refer to a motor joint as means for controlling direction, this is given as an example only and should not be construed as limiting. Instead, it is possible to exchange the shown and described lighting units with a motor joint by alternative lighting units as will next be described.

Figure 9A:
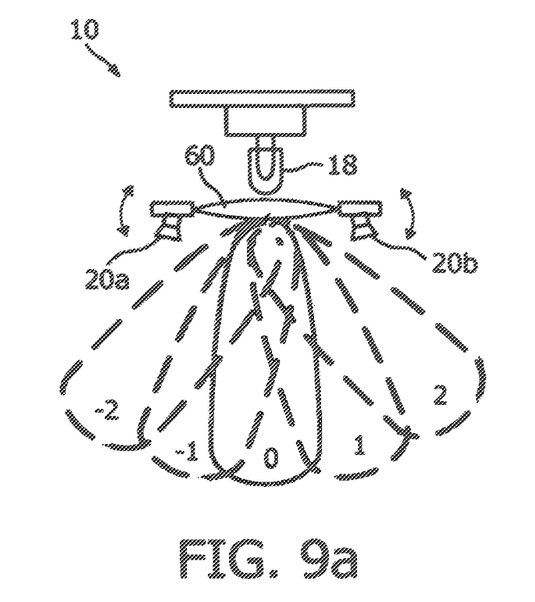
FIG. 9a, 9b show different embodiments of direction controllable lamps.

As shown in FIG. 9a, direction of the light emission into different directions (designated here—2 . . . 2) may be achieved by mechanical movement, e.g. rotation, of an optical device 60 positioned in the beam path of a light source 18 (in this case shown to be an LED, but the light source 18 could, of course, be of any other type). The optical device shown may be e.g. a lens, or a diffusor, and may be moved e.g. by a motor. Alternatively, the optical device may be a reflector. The position of the optical device controls the direction of the light emission. As in the above described case of mechanical movement of the fixture 14, not only rotation in the shown plane, but also around a perpendicular axis is possible.

Figure 9B:
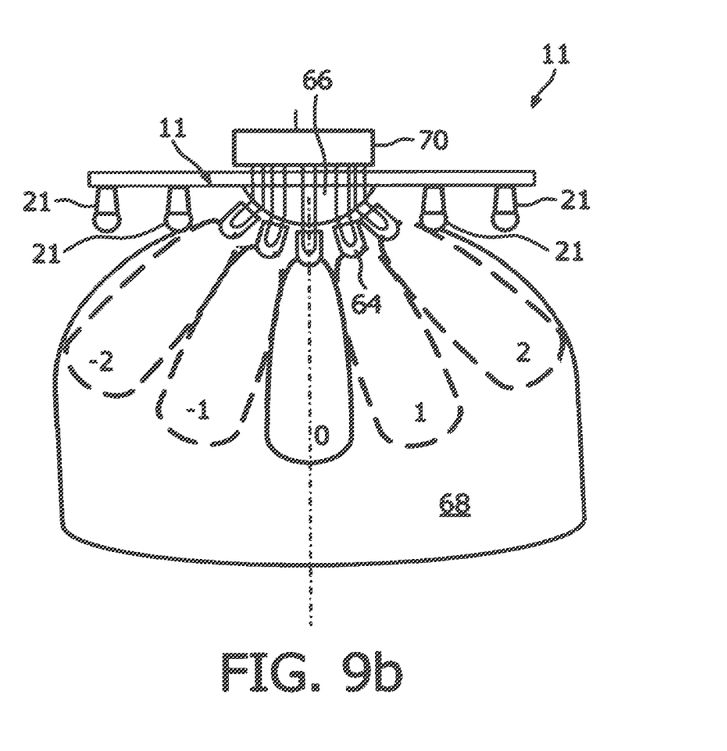

In a further embodiment shown in FIG. 9b, a lighting unit 11 comprises a plurality of individually controllable light sources 64 mounted on a common body 66 such that they emit a directed light emission into different directions. The whole range of possible light emissions from lighting unit 11 is designated in FIG. 9b as beam pattern 68, and is made up by bordering light emissions from the individual light sources 64. Alternatively, the light emissions may also be overlapping.

A control circuit 70 is provided which receives input commands for a desired intensity and direction of the light emission from lighting unit 11 and drives the individual light sources 64 to achieve, as a resulting sum output, the desired emission. This is achieved without mechanical movement of any part of lighting unit 11. For example, if emission only in direction 0 is desired, the control device 70 may control the light sources 64 such that they are all switched off, except for the central light source pointing in the "0" direction. Similarly, if a beam direction of "−2" is desired, only the light source 64 to the left would be switched on. In case of desired light emission in between two directions at which light sources 64 are provided, e.g. for a light direction of "−1.5", this may be achieved by operating certain light sources 64 in a partially dimmed state, e, g, by operating the two left most LEDs at 50% light contribution.

Thus, lighting unit 11 may achieve a directed illumination within a substantial range 68 without any mechanically moving parts.

The shown light sources 64 here are preferable LEDs, as shown in the figure, but may alternatively of course be other, preferable dimmable types of light sources.

Also mounted at the lighting unit 11 are ultrasound means, in the shown example a plurality of (here shown: 4) ultrasound receivers 21, also mounted in mechanically fixed way. As described above, the ultrasound signals received by ultrasound receivers 21 may be processed to determine the relative orientation towards an ultrasound transmitter, the signal of which is received in each of the ultrasound receivers 21. For example, know array processing techniques utilizing phase differences in the signal received at the individual receivers 21 may be used, such as described in the article "Two Decades of Array Signal Processing Research" by Hamid Krim and Mats Viberg in IEEE Signal Processing Magazine, July 1996, pp 67-94.

After thus the relative orientation towards a mobile control element with an ultrasound transmitter is determined, the control device 70 may accordingly control the light sources 64 of the lighting unit 11 to point into the determined direction.

Figure 10:
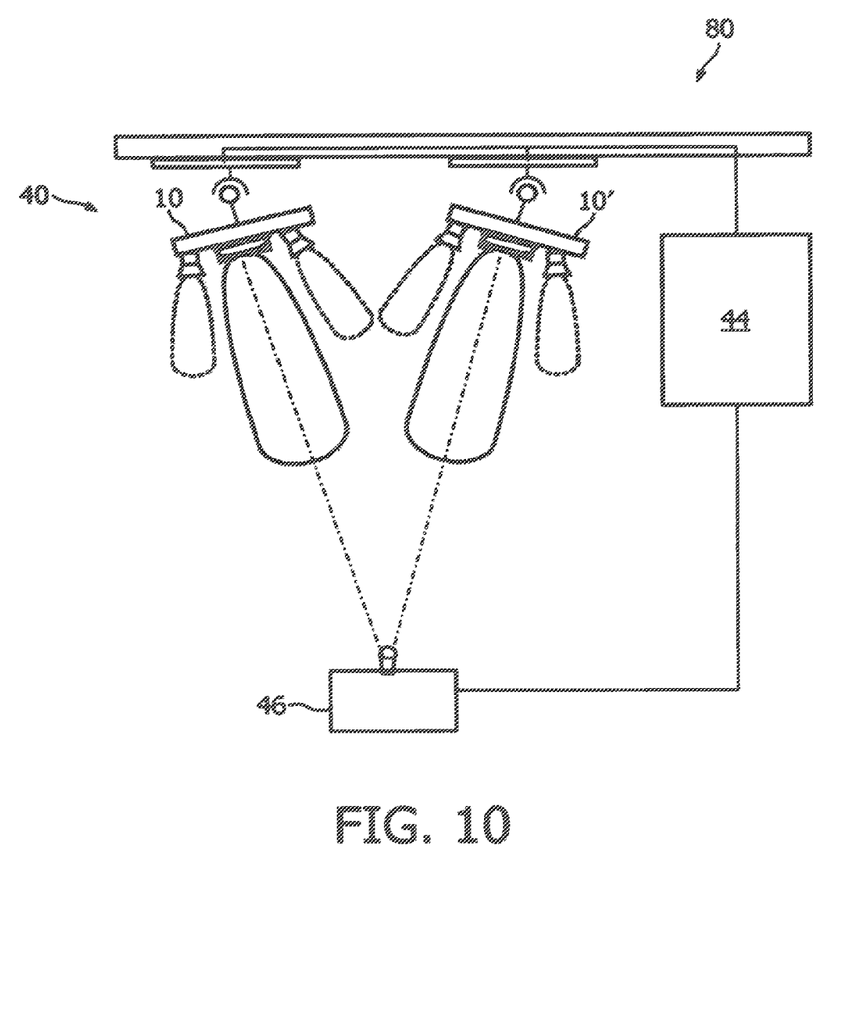
FIG. 10 shows a further embodiment of a lighting system comprising multiple direction controllable lamps.

FIG. 10 shows a further lighting system 80 to illustrate in an example how multiple direction controllable lighting units 10, 10' may be controlled. It should be noted that the shown type of direction controllable lighting units 10, 10', which are controllable by motor joints, have a halogen lamp as main light source, and have two transmitters as first ultrasound means are given as an example only, and of course could be replaced by any of the further described lighting units, methods of controlling direction and types of light sources.

In the case of multiple direction controllable lighting units as shown in the lighting system 80 of FIG. 10, the embedded codes in the ultrasound emission of the sources are unique. Thus, e.g. the ultrasound transmitter to the left of the first direction controllable lighting unit 10 may be distinguished by its embedded code not only from the other transmitter of the same lighting unit, but also from all other ultrasound transmitters of other lighting units.

The user, who wants to control the lighting system 80, proceeds as follows:

First, the directional lighting unit of which the direction is to be controlled first is identified. This could be done e.g. by holding the mobile control element 46 close to the ultrasound emitting part of the lighting unit, so that the control element 46 now identifies the codes emitted to identify the lighting unit. Another method could be by use of a user interface device which identifies the controllable lighting devices. A selected lighting unit may start flashing, so that the user can identify the presently selected lighting unit.

Another method would be to put the control device in the light beam of the spot. Based on the difference in amplitude/phase of pairs of codes/identifiers/signals, the device can select the lamp to be controlled, e.g. the lamp where the signals from the two sources have the lowest phase/amplitude difference.

After the selection is effected, the control element 46 is placed at a location where the emitted light from the directional light source is supposed to be targeted. The user then initiates automatic control, so that control unit 44 automatically adjusts the selected lighting unit 10 to point to this location.

Control is effected as described above by measuring the contribution of the individually coded ultrasound emissions in the signal received at the control element 46 and communicating the demodulated information to the control unit 44. Here a desired direction of the lighting unit 10 is calculated by a closed-loop control algorithm based on the current measurement, or together with a set of previous measurements. This direction is communicated to the direction controllable lighting unit 10, so that the lighting unit 10 changes its emission direction based on the communicated control data (which change could be effected, e.g., according to one of the embodiments described above).

The measurement and adjustment steps described above are repeated until a satisfactory result is achieved.

Within control unit 44, control is thus effected according to a control algorithm which yields in each step the new direction of the lighting unit 10. An example of a control algorithm could be to try a discrete set of possible directions and chose the one with the highest score according to the evaluation criteria. Other methods could be based on adaptive filtering (LMS, RLS algorithms) or other optimization techniques known per se to the skilled person.

After direction of the first lighting unit 10 has thus been adjusted, the user mad node proceed to adjust direction of a second controllable lighting unit 10'. This lighting unit may be directed to the same location, or the control element 46 may be moved to direct the second lighting unit 10' to a different location.

Alternatively, it is also possible to simultaneously control both (or in the case of further available lighting units: all, or at least a subset) of the direction controllable lighting units in the lighting system 80, such that they are all directed to the location of the optical sensor 46.

While in the above described examples directional control is only effected in a 2D plane, the concept of course also applies to 3 dimensions.

The invention has been illustrated and described in detail in the drawings and foregoing description. Such illustration and description are to be considered illustrative or exemplary and not restrictive; the invention is not limited to the disclosed embodiments.

There are a plurality of further features possible, such as

Alignment of spots with offset to the mobile control element In the above examples it was shown how the lighting units could be controlled to point directly to the control element 46. It should be noted that it is of course also possible to automatically obtain a lighting direction with a predetermined—fixed or variably chosen—offset angle. E.g. the operator could choose to adjust a spot such that it should point a predetermined angle, say 10°, above the position of the control element 46.

Times at which ultrasound signals are transmitted In the foregoing text, the lighting units and ultrasound transmitters have been described with relation to their special feature of emitting or receiving ultrasound signals to facilitate control. Of course, it is still the main purpose of the lighting units to provide the desired illumination for lighting. Thus, after control has successfully been effected, the transmitters described above may continue to emit modulated ultrasound signals, will preferably be in an operating mode, where the ultrasound means are disabled until reactivated by entering a new direction control mode.

In fact, in a system with a plurality of lighting units, the ultrasound transmitters of each lighting unit may be operated in a way such that they emit ultrasound signals only if their lighting unit is specifically selected for control. Thus, an operator could select a limited number, or even only one lighting unit for control. The control unit would then assign codes to the transmitters of the selected lighting unit(s). This would greatly facilitate handling of codes, because for effective control the codes need to be unique. If codes are consequently only used when specifically needed, a limited number of codes may suffice. It is even possible that in each of a plurality of lighting units the transmitters have the same code, if it is ensured that they are not operated (controlled) simultaneously.

Additional control of intensity and color

By the techniques of this invention, it may also be possible to control, in addition to the direction of lighting units, intensity and/or color of the light emission. This could be done manually at a user interface, e.g. located at the control element 46, or by an automatic control effected through control unit 44. For example, the intensity is increased as a function of the orientation of the lighting unit to achieve a constant light intensity at the target location.

In the claims, the word "comprising" does not exclude other elements, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A direction controllable lighting unit including at least one direction controllable lighting unit, comprising:
    a mechanically movable element for directing a light emission into different directions along a light emission output axis;
    at least two ultrasound receiver units disposed at said movable element;
        wherein said at least two ultrasound receiver units are disposed at said lighting unit in such a way that they differ in at least one of: position, direction of spatial intensity distribution of emission, shape of spatial intensity distribution of emission, direction of spatial distribution of reception sensitivity, or shape of spatial distribution of reception sensitivity and are offset from said light emission output axis;
        said ultrasound receiver units are operable to receive distinguishable ultrasound signals;
    a mobile control element including at least one ultrasound transmitter unit; and
    a controller to evaluate a signal transmitted at the at least one receiver units,
        wherein a difference between signals of different receiver units received at the receiver unit is used to determine a relative direction of said direction controllable lighting unit and said mobile control element and to control the direction of said controllable lighting unit dependent on said relative direction.

2. The direction controllable lighting unit according to claim 1 wherein said movable element for directing a light emission includes a driver to control a plurality of light sources facing in different, fixed directions to direct a resulting sum light emission, wherein said sum light emission is directed by controlling a relative intensity of light emission from said light sources.

3. The direction controllable lighting unit according to claim 1 wherein said control element is disposed to control said controllable lighting unit such that its direction is adjusted to point to the position of said mobile control element.

4. The direction controllable lighting unit according to claim 1 wherein said controller is disposed to evaluate said difference relating to at least one of phase or amplitude of said signal.

5. The direction controllable lighting unit according to claim 4 wherein both said signals are received at said receiver units, wherein said controller is disposed to analyze at least one parameter relating to a difference between said signals, where said parameter is dependent on at least one of phase or amplitude of said signals, and wherein said signals are distinguishable by the use of a time, code and/or frequency multiple access technique.

6. The direction controllable lighting unit according to claim 1 wherein said controller is disposed to activate said ultrasound receivers only in a direction control mode of said lighting unit, where the direction is to be adjusted, and to deactivate said-ultrasound receivers in an operating mode, where adjusted direction is held constant for lighting operation.

7. A direction controllable lighting unit including at least one direction controllable lighting unit comprising
   a mechanically movable element for directing alight emission into different directions along a light emission output axis;
   at least two ultrasound receiver units disposed at said movable element for moving therewith,
   wherein said a least two ultrasound receiver units are disposed at said lighting unit in such a way that they differ in at least one of: position, direction of spatial intensity distribution of emission, shape of spatial intensity distribution of emission, direction of spatial distribution of reception sensitivity, or shape of spatial distribution of reception sensitivity and are offset from said light emission output axis,
   said ultrasound receiver units are operable to transmit distinguishable ultrasound signals,
   a mobile control element including at least one ultrasound transmitter unit, and control means to evaluate a signal received at the receiver units, wherein a difference between signals of different receiver units is used to determine a relative direction of said direction controllable lighting unit and said control element, and to control the direction of said controllable lighting unit dependent on said relative direction.

8. The direction controllable lighting unit according to claim 7 wherein said movable element for directing a light emission comprise driving means to control a plurality of light sources facing in different, fixed directions to direct a resulting sum light emission, wherein said sum light emission is directed by controlling a relative intensity of light emission from said light sources.

9. The direction controllable lighting unit according to claim 7 wherein said control means are disposed to control said controllable lighting unit such that its direction is adjusted to point to the position of said mobile control element.

10. The direction controllable lighting unit according to claim 7 wherein said control means is disposed to evaluate said difference relating to at least one of phase or amplitude of said signal.

11. The direction controllable lighting unit according to claim 10 wherein
    both said signals are received at said receiver units, wherein said control means are disposed to analyze at least one parameter relating to a difference between said signals, where said parameter is dependent on at least one of phase or amplitude of said signals, and wherein said signals are distinguishable by the use of a time, code and/or frequency multiple access technique.

12. The direction controllable lighting unit according to claim 7 wherein said control means is disposed to activate said ultrasound receiver only in a direction control mode of said lighting unit, where the direction is to be adjusted, and to deactivate said ultrasound receiver in an operating mode, where adjusted direction is held constant for lighting operation.

* * * * *